Oct. 27, 1970
R. HESS
3,536,307
CIRCULAR TRAVELING GRATE MACHINE
Filed Nov. 8, 1968
3 Sheets-Sheet 1
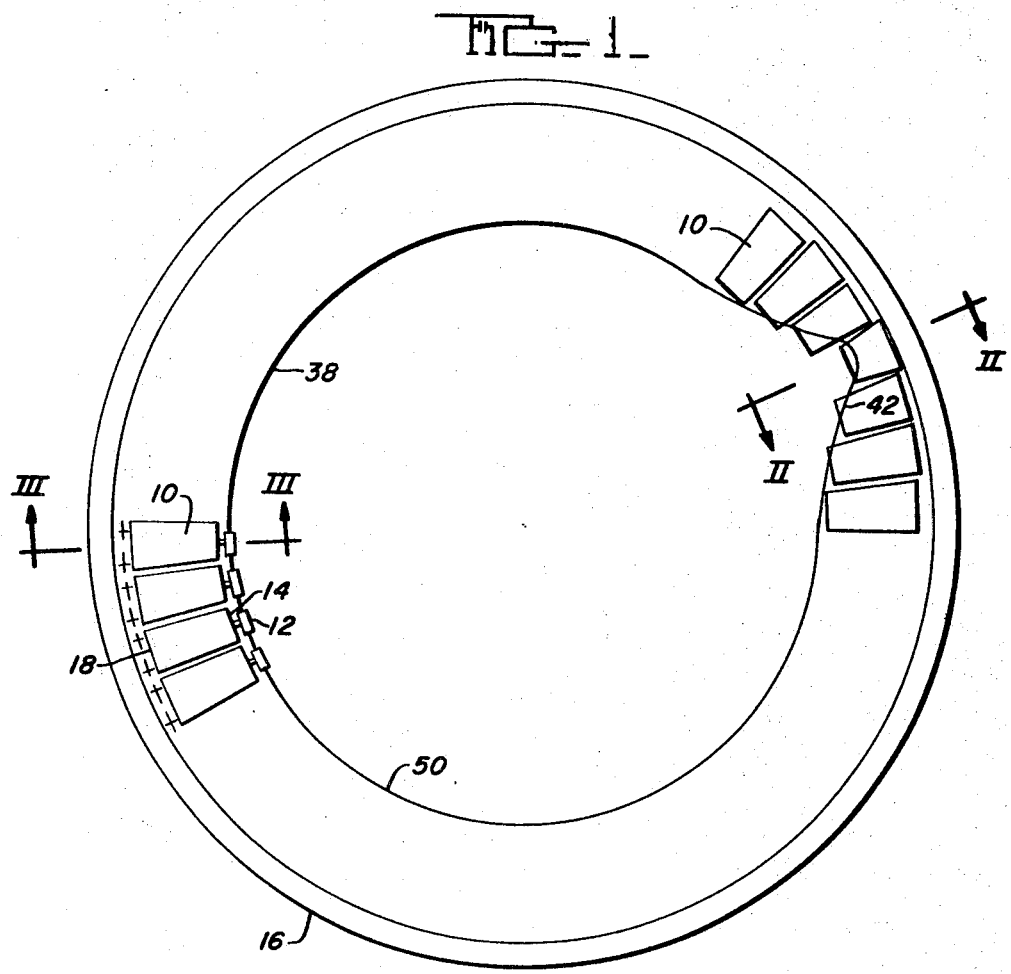
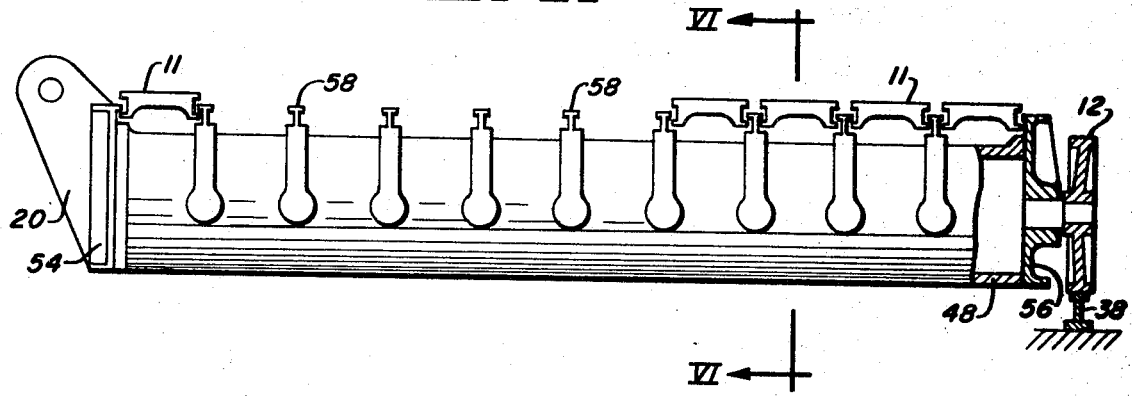
INVENTOR
RULDOLF HESS
By Parmelee, Utzler & Walsh
his Attorneys Oct. 27, 1970   R. HESS   3,536,307
CIRCULAR TRAVELING GRATE MACHINE
Filed Nov. 8, 1968   3 Sheets-Sheet 2

INVENTOR
RULDOLF HESS
By Parmelee, Utzler & Welsh
Attorneys

Oct. 27, 1970

R. HESS 3,536,307

CIRCULAR TRAVELING GRATE MACHINE

Filed Nov. 8, 1968

INVENTOR
RULDOLF HESS

By Parmelee, Utzler & Welsh
his Attorneys

United States Patent Office 3,536,307
Patented Oct. 27, 1970

3,536,307
CIRCULAR TRAVELING GRATE MACHINE
Rudolf Hess, Frankfurt am Main, Germany, assignor to Dravo Corporation, Pittsburgh, Pa., a corporation of Pennsylvania
Filed Nov. 8, 1968, Ser. No. 774,425
Int. Cl. F27b 9/00, 21/02
U.S. Cl. 263—28                                  10 Claims

ABSTRACT OF THE DISCLOSURE

A circular traveling grate machine comprising a plurality of grate carriages arranged in end-to-end circular succession constituting a circular-hearth for carrying a load of material through a zone of maximum temperature is disclosed. Each grate carriage, has one side thereof operatively hinged to a rotatable annular support member and each carriage is provided with at least one wheel on its opposite side. The wheels of the carriages roll on a rail that is radially spaced from the annular support member and the arrangement is such that the annular support member is located outside the zone of maximum temperature through which the carriages move during heat treatment of material placed thereon.

FIELD OF THE INVENTION

The invention relates to a traveling grate apparatus or the like and more particularly to a circular traveling grate machine.

BACKGROUND OF THE INVENTION

Traveling grate machines and the like for firing, roasting, sintering, pelletizing, etc. most widely used are of the endless belt type wherein the material to be thermally treated is carried on pallets horizontally along a top reach of the machine while the pallets return empty on the lower reach so that only about 40% of the hearth surface is in use at any one time. For this reason, circular type apparatus is desirable, since 80 to 85% of the grate or hearth surface may be productively utilized all of the time. However, the use of circular types of machines has been limited due to the fact that under the high temperatures that such machines must at times be operated, thermal expansions and stresses developing in the apparatus cannot be adequately relieved, resulting in damage or permanent deformations to parts of the apparatus.

Usually circular traveling grate and similar roasting apparatus of this type comprises a succession of segment-shaped wheeled carriages forming a substantially continuous annulus. The carriages have inner and outer wheels traveling on concentric inner and outer rails with provision at some point in the circular travel for tilting the carriages in succession to dump material therefrom after the material has been fired, roasted or sintered as the case may be. The beds of the carriages provide a hearth for carrying a load of loose material, and in most cases the hearth is comprised of grates that support the material while gases flow vertically through the bed between hoods above the apparatus and windboxes between the rails below the carriages. In such apparatus, thermal expansion both radially and circumferentially presents especially difficult problems. The massive structure of the carriages develops substantial centrifugal forces even at relatively low speeds, and under the influence of high temperatures, the carriages expand both in the length and width thereby enlarging the diameter of the running circle of the carriages while the mean diameter of the tracks remains substantially the same. The results in the individual carriages jamming with the carriage disposed ahead of or behind it and results in very strong forces acting on the wheel flanges or guide rollers normally provided on the carriages to overcome centrifugal forces, which forces may damage or cause these parts to break.

Attempts have been made to overcome these difficulties in such machines but thus far these attempts have not been fully successful. Water cooling various parts of the circular machines, such as the axles, grate bars and side walls of the carriages has been proposed. However, aside from the high heat losses resulting from water cooling, and the need for an adequate supply of cold water, mechanical problems in maintaining water tight seals between fixed and moving parts have been expensive and been a source of much difficulty.

SUMMARY OF THE INVENTION

The problems discussed above are substantially reduced, if not entirely eliminated, by the apparatus of the present invention in which the thermal expansion and stresses occurring during operation of the apparatus are provided for without the use of water cooling devices or the use of wheel flanges and their attendant disadvantages.

Briefly, the present invention provides a circular traveling grate machine comprising a plurality of grate carriages arranged in spaced apart end-to-end circular succession constituting a circular rotatable hearth for carrying a load of material to be treated through a zone of maximum temperature. Each of the carriages, on one side thereof, is pivotally connected to a rotatable annular support member having a vertical axis of rotation and each carriage is provided with at least one wheel on its opposite side which rolls on a rail spaced radially of the annular support member. The rail is disposed in a horizontal plane for a major portion of its annular length, and over a minor portion of its annular length, dips down from the horizontal plane and radially outwardly of the vertical axis of rotation of the annular support member. The arrangement is such that the carriages are moved in a circular manner through the zone of maximum temperature while the annular support member is located outside this zone, and after the material on the carriages has been treated, each carriage is tilted downwardly in succession to discharge the material therefrom.

Because of this arrangement, with the annular support member being located outside the zone of maximum temperature and with each of the individual carriages being spaced apart and fixed in position relative to annular support member, each carriage can expand both radially and circumferentially under the influence of high temperatures without jamming or wedging against the one lying ahead or behind it.

Also, each of the grate carriages, according to the present invention, is constructed so as to provide a minimum of heat transfer from the hearth surface to the main supporting member for the various individual grate carriages. To this end, each of the grate carriage includes a tubular main supporting member having opposite ends. A longitudinally extending member is secured to each of the opposite ends of the tubular supporting member. Positioned between the side members are a plurality of spaced longitudinally extending saddle pieces which are supported in spaced relation relative to the tubular main supporting member by means of bolts passing through depending portions of the saddle pieces and through the tubular main support. A plurality of grate bars are supported on the saddle pieces forming the hearth on which material to be treated is placed. Because of this construction, the spacing provided between the saddle pieces and the tubular main supporting member of the carriages reduces heat transfer from the hearth and the saddle pieces to the tubular main supporting member resulting in less likelihood of permanent deformations taking place in the tubular main supporting member.

3

Other advantages and a more complete understanding of the present invention will become apparent from the following description, taken in conjunction with the accompanying drawing showing only a preferred embodiment of the invention.

BRIEF DESCRIPTION OF THE DRAWINGS

FIG. 1 is a diagrammatic plan view of the circular traveling grate machine according to the present invention;

FIG. 5 is a front view in elevation and partial section of a grate carriage.

DESCRIPTION OF THE PREFERRED EMBODIMENT

Figure 2:
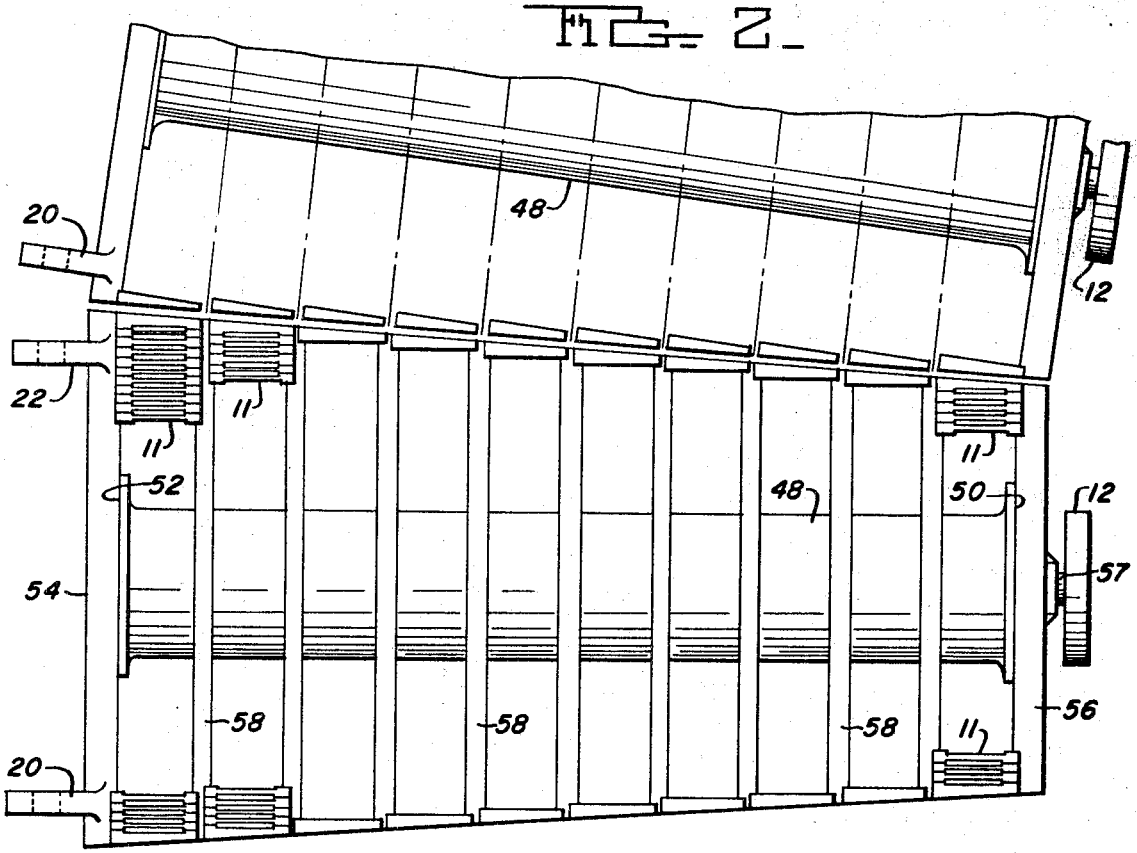
FIG. 2 is a plan view of a grate carriage according to the present invention.
Figure 3:
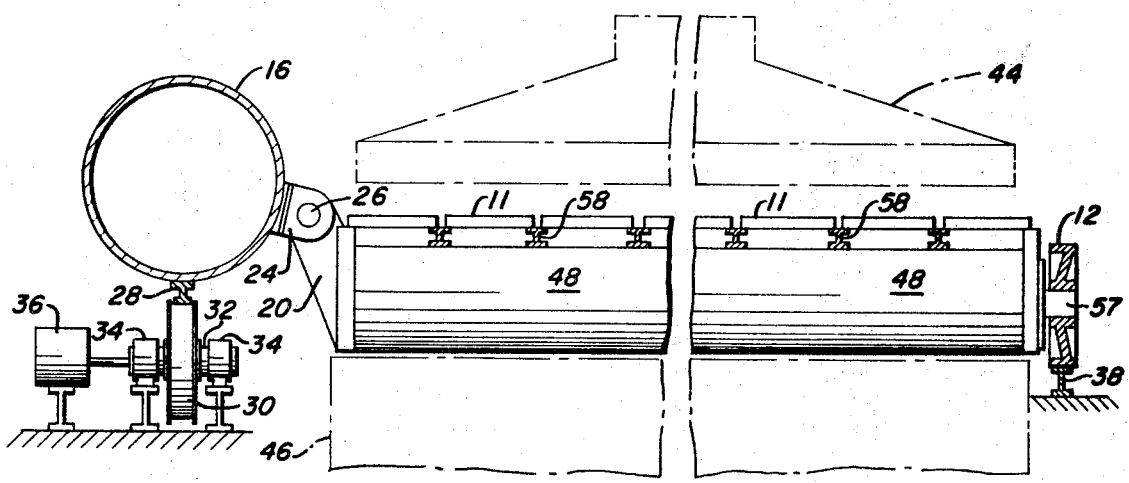
FIG. 3 is a transverse section of the traveling grate machine taken along the line III—III of FIG. 1.
Figure 4:
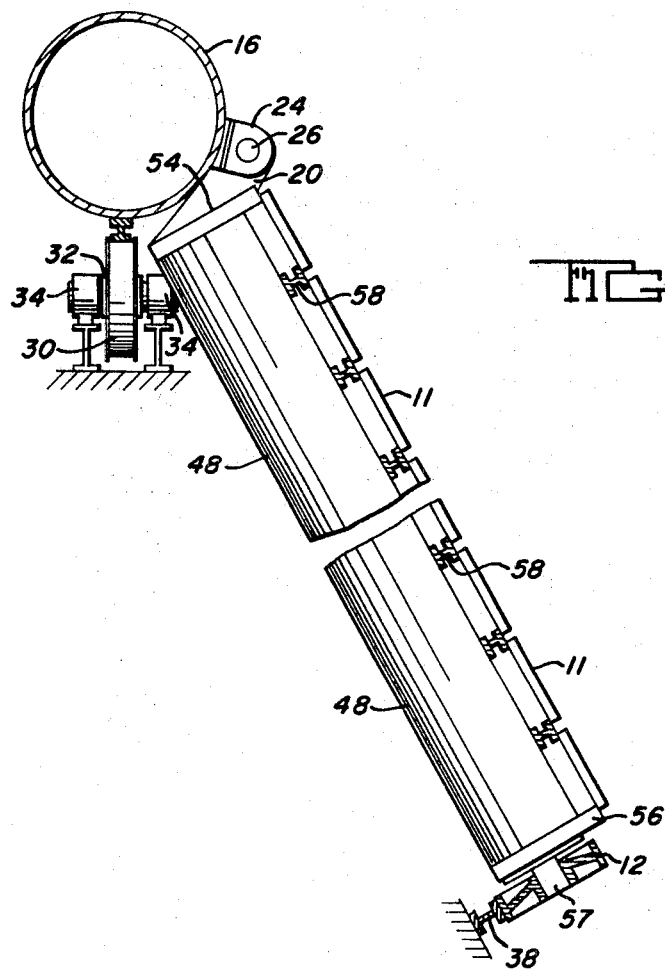
FIG. 4 is a transverse section of the traveling grate machine taken along the IV—IV of FIG. 1.

Referring now to the drawings wherein like reference numerals refer to like parts in the several views, the annular or circular traveling grate machine according to the invention comprises a plurality of carriages 10 having grate bars 11 supported thereon. The carriages 10 are arranged in spaced apart end-to-end circular succession constituting a circular rotatable hearth. Each of the carriages have a wheel 12 on their inner sides 14 and each is secured to a rotatable, circular carriage support member 16 on their opposite or outer sides 18. As best seen in FIGS. 2, 3 and 4, each of the carriages 10 are pivotally secured to the annular support member 16 through a pair of spaced arms 20 and 22 provided on the outer sides of each carriage, a pair of spaced clevis members 24 provided on the support member 16, and a pair of short shafts 26 passing through the arms and the clevis members.

Bearings are preferably provided for the shafts 26 to prevent undue wear and to provide for smooth downward swinging movement of the carriages 10 as will be described hereinafter. The carriages 10 are thus operatively connected to the carriage support member 16 for circular movement therewith and for tilting movement relative thereto about a horizontal axis.

The tubular annular support member 16 has a circular rail 28 secured to the underside thereof which is guided on and travels over rollers 30 located about the circumference of the traveling grate machine. The rollers 30 are supported on shafts 32 which are journaled for rotation in bearing blocks 34. Several of the rollers 30 are drive rollers which are driven through suitable power means, such as a motor, as is shown schematically at 36 in FIG. 3.

Spaced radially inwardly of the rotatable support member 16 is a rail 38 over which the wheels 12 of the carriages roll. The rail 38 has a major portion 50 lying in a substantially horizontal plane and a minor portion 42 which dips down from the horizontal plane and radially outwardly of the vertical axis of rotation of the support member 16. The major portion 50 of the rail 38 cooperates with the support member 16 so as to maintain the carriages 10 in a predetermined horizontal planar relationship to maintain material thereon. The minor portion 42 of the rail 38 cooperates with the support member 16 so as to effect successive downward pivotal movement of the carriages 10 out of and into the horizontal plane in a manner to effect discharge of material from the carriages 10.

Hoods ad windboxes shown schematically in FIG. 3 at 44 and 46, respectively, are provided above and below the carriages 10 whereby hot gases may be forced through material on the circular rotatable hearth.

With this arrangement, material can be placed on the hearth surface provided by the carriages 10 and the carriages 10 can be moved in a circular manner through a zone of maximum temperature while the support member 16 is located outside this zone. After the material on the carriages 10 has been treated, each carriage will be pivoted downwardly in succession to discharge the treated material therefrom.

The carriages being secured to the annular support member 16 and slightly spaced from one another when they are cold may expand in a circular direction without jamming. As the circular support member 16 does not expand, radial expansion of the carriages is inward toward the center of the machine. Of course, the rail 38 and wheels 12 are so proportioned to allow for this inward movement. Thus, by locating the annular support member 16 outside the zone of maximum temperature through which the carriages 10 move, many of the difficulties, as discussed above, which are inherently present in certain prior art constructions are thereby avoided.

Figure 6:
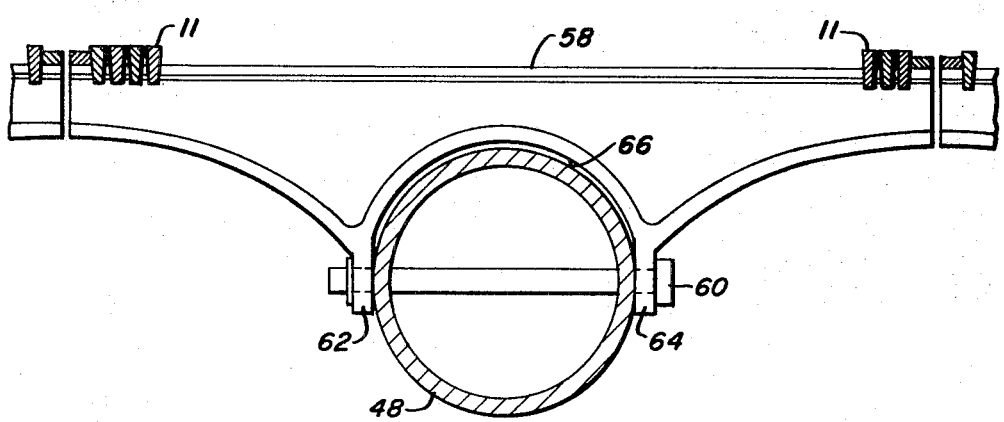
FIG. 6 is a transverse section taken along line VI—VI of FIG. 5.

Referring now more particularly to FIGS. 2, 5 and 6, each grate carriage 10 comprises a transverse tubular main supporting member 48 having opposite inner and outer ends 50 and 52, respectively. A pair of spaced, longitudinally extending side members 54 and 56 are secured to each of the opposite ends of main supporting member 48. A stub shaft 57 is provided on side member 56 on which wheel 12 is journaled for rotation. Supported on the main supporting member 48 and positioned between the side members 54 and 56 are a plurality of spaced, longitudinally extending saddle pieces 58 which support the grate bars 11. The saddle pieces 58 are supported on the main supporting member 48 by means of bolts 60 which pass through depending portions 62 and 64, provided on the saddle pieces 58, and through the tubular main supporting member 48. The central portion 66 of the underside of each saddle piece 58 is arcuate in shape and located in spaced relation relative to the main supporting member 48. This arrangement reduces heat transfer from the hearth of the carriage to the supporting member 48 because the only direct heat conducting paths from the grate bars 11 and their supports 58 to the main supporting member 48 are through the widely spaced depending legs 62 and 64. These being of small mass and separated as they are, may readily radiate heat and will not themselves be subject to the same stresses and resulting warping that is inherent in many prior constructions.

I claim:
1. A circular traveling grate machine for the heat treatment of various materials comprising:
 (a) a rotatable annular support member having a vertical axis of rotation,
 (b) means for rotating the support member about its vertical axis,
 (c) a plurality of grate carriages arranged in end-to-end circular succession constituting a circular rotatable hearth, each carriage being hinged to the support member at one side for movement therewith whereby its other side may move in a vertical arc relative to the support member, each carriage having at least one wheel spaced radially from the support, and
 (d) a rail radially spaced from the support member and on which the wheels of the carriages roll, said rail through the greater portion of its periphery being concentric with the support and at a level with respect to the support that the grates are in a common substantially level plane, one portion of the rail dipping down from said plane and curving toward the support and then curving upwardly away from the support to the concentric portion of the rail whereby the wheels of successive carriages travel down the dipping portion of the rail to tilt the carriage in an arc and then climb back from the low point of the rail to restore the carriages to the common substantially level plane, the arrangement being such that the annular support member is located outside the zone of maximum temperature through which the carriages move during heat treatment of material placed on the hearth.

2. A circular traveling grate machine for the thermal treatment of various materials comprising:
 (a) a rotatable annular support member having a vertical axis of rotation,
 (b) means for rotating the support member about the vertical axis,
 (c) an annular rail spaced radially inwardly of the support member which is disposed in a horizontal plane for a major portion of its annular length, and over a minor portion of its annular length, dips down from the horizontal plane and radially outwardly of the vertical axis of rotation of the support member, and
 (d) a plurality of grate carriages, each grate carriage being pivotally connected to the support member for circular movement therewith and for pivotal movement about a horizontal axis, each carriage having a wheel that rolls on the rail, the arrangement being such that the carriages may be moved in a circular manner through a zone of maximum temperature, and after the materials on the carriages have been treated, each carriage may be pivoted downwardly in succession to discharge the material therefrom.

3. A circular traveling grate machine as defined in claim 2 wherein the annular support member comprises a circular tube having a circular rail secured to the underside thereof, and the means for rotating the support member about the vertical axis comprises at least one power driven roller over which the circular rail travels.

4. A circular traveling grate machine according to claim 2 wherein each of the grate carriages includes a radially disposed tubular main supporting member having inner and outer ends, and a pair of radially spaced, longitudinally extending side members secured to the respective inner and outer ends of the main supporting member, the outer member of each carriage being pivotally connected to the annular support member and the inner side member of each carriage including a stub shaft on which the wheel of the carriage is journaled for rotation.

5. A circular traveling grate machine according to claim 4 wherein each grate carriage includes a plurality of radially spaced, longitudinally extending saddle pieces supported on the main supporting member and positioned between the side members, and a plurality of grate bars supported on the saddle pieces to provide a hearth surface on each carriage.

6. A circular traveling grate machine according to claim 5 wherein each of the saddle pieces are supported on bolts which pass through the tubular main supporting member such that the saddle pieces are supported in spaced relation relative to the tubular main supporting member, thereby reducing heat transfer from the saddle pieces to the tubular main supporting member.

7. In a traveling grate machine, in combination,
 (a) a plurality of carriages arranged in spaced apart end-to-end circular succession constituting a circular rotatable hearth, each carriage having at least one wheel on one side thereof,
 (b) a rotatable circular carriage support member to which each of the carriages are pivotally mounted on the sides opposite the wheels, and
 (c) a rail radially spaced from the circular carriage support member and on which the wheels of the carriages roll, the rail having a major portion and a minor portion, the major portion cooperating with the support member so as to maintain the carriages in a predetermined planar relationship to maintain material on the hearth, the minor portion cooperating with the support member so as to effect successive pivotal movement of the carriages out of and into the predetermined planar relationship in a manner to effect discharge of material from the carriages.

8. In a traveling grate machine for the thermal treatment of various materials, in combination
 (a) a plurality of carriages arranged in end-to-end circular succession constituting a circular rotatable hearth for carrying a load of material through a zone of maximum temperature, each carriage having at least one wheel on one side thereof,
 (b) a rotatable circular carriage support member to which each of the carriages are pivotally connected on the sides opposite the wheels, the support member being located outside the zone of maximum temperature, and
 (c) a rail spaced from the support member and on which the wheels of the carriages roll, the rail having major and minor portions whereby as the carriages are moved along the major portion of the rail, each carriage will be maintained substantially level, and along the minor portion of the rail, each carriage will be pivoted in succession to discharge material therefrom.

9. A traveling grate carriage comprising:
 (a) a transverse main supporting member having opposite ends,
 (b) a pair of spaced, longitudinally extending side members, one of the side member being secured to each of the opposite ends of the main supporting member,
 (c) a plurality of spaced, longitudinally extending saddle pieces supported on the main supporting member and positioned between the side members, the saddle pieces being supported on the main supporting member in spaced relation relative thereto, and
 (d) a plurality of grate bars supported on the saddle pieces providing a hearth surface for carrying material.

10. A traveling grate carriage as defined in claim 9 wherein the main supporting member comprises a tubular member and each of the saddle pieces is supported thereon by means of bolts which pass through portions of the saddle piece and through the tubular member.

References Cited

UNITED STATES PATENTS 1,433,354    10/1922    Dwight    266—21
2,480,726    8/1949    Greyson    266—21 X JOHN J. CAMBY, Primary Examiner U.S. Cl. X.R.

266—21